(12) United States Patent
Lee et al.

(10) Patent No.: US 12,204,206 B2
(45) Date of Patent: Jan. 21, 2025

(54) DISPLAY PANEL FOR HOME APPLIANCES, METHOD OF MANUFACTURING THE SAME, AND DISPLAY DEVICE INCLUDING THE SAME

(71) Applicant: SAMSUNG ELECTRONICS CO., LTD., Suwon-si (KR)

(72) Inventors: Minkyung Lee, Suwon-si (KR); Youngdeog Koh, Suwon-si (KR); Kwangjoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/425,424

(22) Filed: Jan. 29, 2024

(65) Prior Publication Data

US 2024/0310674 A1    Sep. 19, 2024

Related U.S. Application Data

(63) Continuation of application No. PCT/KR2023/021473, filed on Dec. 22, 2023.

(30) Foreign Application Priority Data

Mar. 15, 2023    (KR) .......................... 10-2023-0033740

(51) Int. Cl.
  *G02F 1/1335*    (2006.01)
  *G02F 1/1333*    (2006.01)
  *G09G 3/36*    (2006.01)

(52) U.S. Cl.
  CPC .... *G02F 1/133607* (2021.01); *G02F 1/13338* (2013.01); *G09G 3/3677* (2013.01); *G09G 3/3688* (2013.01); *G09G 2310/0278* (2013.01)

(58) Field of Classification Search
  CPC ......... G02F 1/133611; G02F 1/133607; G02F 1/133512; G02F 1/133504; G02F 1/1335;
  (Continued)

(56) References Cited

U.S. PATENT DOCUMENTS 10,222,925 B2    3/2019    Han et al.
10,775,924 B2    9/2020    Shin et al.
(Continued)

FOREIGN PATENT DOCUMENTS

JP    2007-271862 A    10/2007
KR    10-1260120 B1    5/2013
(Continued)

OTHER PUBLICATIONS

International Search Report dated Mar. 25, 2024 for International Patent Application No. PCT/KR2023/021473.
(Continued)

*Primary Examiner* — William J Carter
(74) *Attorney, Agent, or Firm* — STAAS & HALSEY LLP (57) ABSTRACT

A display panel for a home appliance, including a backlight unit to output light; a micro-lens array on the backlight unit to diffuse the light output from the backlight unit; an optical sheet layer on the micro-lens array to increase straightness of the light diffused by the micro-lens array; a touch panel on the optical sheet layer, through which the straightened light passes; and a surface layer on the touch panel to display an image according to the straightened light, wherein the optical sheet layer is configured to increase the straightness of the light diffused by the micro-lens array so as to increase brightness and sharpness of the image displayed on the surface layer.

20 Claims, 8 Drawing Sheets

(58) Field of Classification Search
CPC ..... G02F 1/1333; G02B 6/003; G02B 6/0031;
G02B 6/0036; G02B 6/006; G02B 6/0088
See application file for complete search history.

(56) References Cited

U.S. PATENT DOCUMENTS

| | | | |
|---|---|---|---|
| 11,360,626 B2 | 6/2022 | Heo et al. | |
| 11,467,444 B2 | 10/2022 | Hudman | |
| 11,526,051 B2* | 12/2022 | Xu | G02F 1/133608 |
| 2021/0072789 A1* | 3/2021 | Rogers | G02B 1/14 |
| 2022/0326572 A1 | 10/2022 | Hou | |

FOREIGN PATENT DOCUMENTS

| | | |
|---|---|---|
| KR | 10-2016-0021572 | 2/2016 |
| KR | 10-1681581 B1 | 12/2016 |
| KR | 10-2018-0003968 | 1/2018 |
| KR | 10-2018-004265 A | 1/2018 |
| KR | 10-2020-0131644 | 11/2020 |
| KR | 10-2021-0061419 A | 5/2021 |
| KR | 10-2022-0140540 | 10/2022 |
| WO | WO 2016/183059 A1 | 11/2016 |
| WO | WO 2020/064404 A1 | 4/2020 |

OTHER PUBLICATIONS

Written Opinion dated Mar. 25, 2024 for International Patent Application No. PCT/KR2023/021473.

* cited by examiner

DISPLAY PANEL FOR HOME APPLIANCES, METHOD OF MANUFACTURING THE SAME, AND DISPLAY DEVICE INCLUDING THE SAME

CROSS-REFERENCE TO RELATED APPLICATIONS

This application is a continuation application of International Application No. PCT/KR2023/021473 designating the United States, filed on Dec. 22, 2023, in the Korean Intellectual Property Receiving Office, which claims priority from Korean Patent Application No. 10-2023-0033740, filed on Mar. 15, 2023, in the Korean Intellectual Property Office, the disclosures of which are hereby incorporated by reference herein in their entireties.

BACKGROUND

Field

Various embodiments of the disclosure relate to a display panel for home appliances, a method for manufacturing the same, and a display device including the same.

Description of Related Art

Display devices are devices that process image signals and image data input from the outside or stored internally through various processes and display them as images on a display panel or screen and may be implemented as various ones, such as TVs, monitors, or portable media players.

Home appliances may adopt a low-light transmittance material, such as natural wood or ceramic, with various colors and textures for luxurious representations. However, if a low-light transmittance material is used for the home appliance, the light output from the display device may not be sufficiently transmitted through the material of the home appliance, deteriorating the brightness and sharpness of the image displayed by the home appliance.

Therefore, a need exists for a display device capable of displaying images with a predetermined brightness and sharpness in home appliances using a low-light transmittance material.

SUMMARY

Various embodiments of the disclosure may provide a display panel for home appliances which displays images on a low-light transmittance material, a method for manufacturing the display panel, and a display device including the display panel.

Aspects of embodiments of the disclosure will be set forth in part in the description which follows and, in part, will be apparent from the description, or may be learned by practice of the presented embodiments.

A display panel for a home appliance according to embodiments of the disclosure may include a backlight unit to output light, a micro-lens array on the backlight unit to diffuse the light output from the backlight unit, an optical sheet layer on the micro-lens array to increase straightness of the light diffused by the micro-lens array, a touch panel on the optical sheet layer, through which the straightened light passes, and a surface layer on the touch panel to display an image according to the straightened light. The optical sheet layer may be configured to increase the straightness of the light diffused by the micro-lens array so as to increase brightness and sharpness of the image displayed on the surface layer.

In an embodiment of the disclosure, the surface layer may include a surface material having a light transmittance of 30% or less. The surface material may include at least one of wood, ceramic, glass, textile, and in-mold decoration.

In an embodiment of the disclosure, the micro-lens array may include a at least one of micro-lens formed in the micro-lens array. The at least one of micro-lens may have at least one of a circular, oval, and polygonal shape.

In an embodiment of the disclosure, the optical sheet layer may have a micro-lens on prism (MOP) structure in which at least one micro-lens sheet is disposed on at least one prism sheet.

In an embodiment of the disclosure, the optical sheet layer may have a prism on prism (POP) structure in which a second prism sheet is disposed on a first prism sheet.

In an embodiment of the disclosure, the optical sheet layer may include a double bright enhancement film (DBEF).

In an embodiment of the disclosure, the touch panel may include at least one of a resistive sensor, a capacitive sensor, an ultrasonic sensor, and an infrared sensor.

In an embodiment of the disclosure, the surface layer on the touch panel may have a thickness of 25 mm to 35 mm.

A method for manufacturing a display panel for a home appliance according to embodiments of the disclosure may include forming a backlight unit to output light, forming a micro-lens array on the backlight unit to diffuse the light output from the backlight unit, forming an optical sheet layer on the micro-lens array to increase straightness of the light diffused by the micro-lens array, forming a touch panel on the optical sheet layer, through which the straightened light passes, and forming a surface layer on the touch panel to display an image according to the straightened light. The optical sheet layer may be configured to increase the straightness of the light diffused by the micro-lens array so as to increase brightness and sharpness of the image displayed on the surface layer. The surface layer may include a surface material having a light transmittance of 30% or less.

In an embodiment of the disclosure, forming the micro-lens array may include forming a at least one of micro-lens, The at least one of micro-lens having at least one of a circular, oval, and polygonal shape.

In an embodiment of the disclosure, forming the optical sheet layer may include forming a micro-lens on prism (MOP) structure in which at least one micro-lens sheet is disposed on at least one prism sheet.

In an embodiment of the disclosure, forming the optical sheet layer may include forming a prism on prism (POP) structure in which a second prism sheet is disposed on a first prism sheet.

In an embodiment of the disclosure, forming the optical sheet layer may include forming a double bright enhancement film (DBEF).

A display device for a home appliance according to embodiments of the disclosure may include a display panel including data lines and gate lines, a data driving circuit to drive at least one data line of the data lines, a gate driving circuit to drive at least one gate line of the gate lines, and a display controller to control the data driving circuit and the gate driving circuit. The display panel may include a backlight unit to output light, a micro-lens array on the backlight unit to diffuse the light output from the backlight unit, an optical sheet layer on the micro-lens array to increase straightness of the light diffused by the micro-lens array, a touch panel on the optical sheet layer, through which the straightened light passes, and a surface layer on the touch panel to display an image according to the straightened light. The optical sheet layer may be configured to increase the straightness of the light diffused by the micro-lens array so as to increase brightness and sharpness of the image displayed on the surface layer.

In an embodiment of the disclosure, the surface layer may include a surface material having a light transmittance of 30% or less. The surface material may include at least one of wood, ceramic, glass, textile, and in-mold decoration.

In an embodiment of the disclosure, the micro-lens array may include a at least one of micro-lens formed in the micro-lens array. The at least one of micro-lens may have at least one of a circular, oval, and polygonal shape.

In an embodiment of the disclosure, the optical sheet layer have a micro-lens on prism (MOP) structure in which at least one micro-lens sheet is disposed on at least one prism sheet.

In an embodiment of the disclosure, the optical sheet layer may have prism on prism (POP) structure in which a second prism sheet is disposed on a first prism sheet.

In an embodiment of the disclosure, the optical sheet layer may include a double bright enhancement film (DBEF).

In an embodiment of the disclosure, the display controller may sense a light transmittance of the surface layer based on artificial intelligence algorithm-based vision examination. The optical sheet layer may control a brightness of the light and a viewing angle based on the sensed light transmittance of the surface layer.

According to various embodiments of the disclosure, a display panel for a home appliance and a display device including the same, according to embodiments of the disclosure, may include a structure in which a micro-lens array diffusing light and an optical sheet layer increasing the brightness of the light are sequentially stacked.

Accordingly, the display panel for home appliances, method for manufacturing the same, and display device including the same according to embodiments of the disclosure may display images with a predetermined brightness and sharpness even in home appliances using a low-light transmittance material.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

Figure 1:
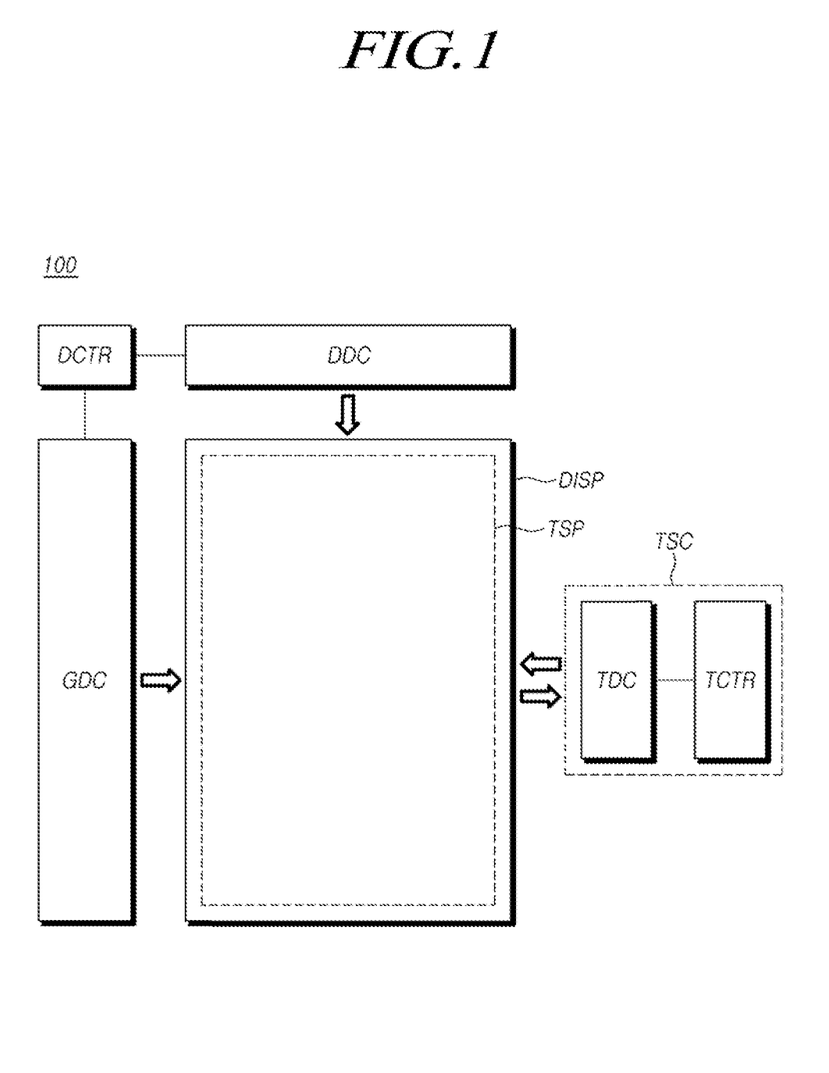
FIG. 1 illustrates a display device according to an embodiment of the disclosure.

FIG. 1 illustrates a display device according to an embodiment of the disclosure.

Referring to FIG. 1, a display device 100 according to embodiments of the disclosure may provide both a function for displaying images and a function for touch sensing.

Specifically, to provide the image display function, the display device 100 according to embodiments of the disclosure may include a display panel DISP, where a plurality of data lines and a plurality of gate lines are arranged, and a plurality of subpixels defined by the plurality of data lines and the plurality of gate lines are arranged, a data driving circuit DDC for driving the plurality of data lines, a gate driving circuit GDC for driving the plurality of gate lines, and a display controller DCTR for controlling the data driving circuit DDC and the gate driving circuit GDC.

The data driving circuit DDC, the gate driving circuit GDC, and the display controller DCTR each may be implemented as one or more individual components. In some cases, two or more of the data driving circuit DDC, the gate driving circuit GDC, and the display controller DCTR may be integrated into a single component. For example, the data driving circuit DDC and the display controller DCTR may be implemented as a single integrated circuit (IC) chip.

Specifically, to provide the touch sensing function, the display device according to embodiments of the disclosure may include a touch panel TSP including a plurality of touch electrodes and a touch sensing circuit TSC supplying touch driving signals to the touch panel TSP, detecting touch sensing signals from the touch panel TSP, and sensing whether there is the user's touch or the position of a touch (touch coordinates) on the touch panel TSP based on the detected touch sensing signals.

For example, the touch sensing circuit TSC may include at least one of a touch driving circuit TDC supplying a touch driving signal to the touch panel TSP and detecting a touch sensing signal from the touch panel TSP and a touch controller TCTR sensing the presence or absence of the user's touch and the position of touch on the touch panel TSP based on the touch sensing signal detected by the touch driving circuit TDC.

The touch driving circuit TDC may include a first circuit part supplying a touch driving signal to the touch panel TSP and a second circuit part detecting a touch sensing signal from the touch panel TSP. The touch driving circuit TDC and the touch controller TCTR may be implemented as separate components or, in some cases, may be integrated and implemented as one component.

Meanwhile, each of the data driving circuit DDC, gate driving circuit GDC and touch driving circuit TDC may be implemented as one or more integrated circuits and, in terms of electrical connection with the display panel DISP, be implemented in a chip-on-glass (COG) type, a chip-on-film (COF) type, or a tape carrier package (TCP) type. The gate driving circuit GDC may also be implemented in a gate-in-panel (GIP) type.

Meanwhile, each of the circuit components DDC, GDC, and DCTR for display driving and the circuit components TDC and TCTR for touch sensing may be implemented as one or more individual components. In some cases, one or more of the circuit components DDC, GDC, and DCTR for display driving and one or more of the circuit components TDC and TCTR for touch sensing may be functionally integrated and implemented as one or more components.

For example, the data driving circuit DDC and the touch driving circuit TDC may be implemented by being integrated into one or more integrated circuit chips. When the data driving circuit DDC and the touch driving circuit TDC are integrated into two or more integrated circuit chips, each of the two or more integrated circuit chips may have a data driving function and a touch driving function.

The display device according to embodiments of the disclosure may come in various types, such as, e.g., an organic light emitting display device or a liquid crystal display device. In the following example, the display device is a liquid crystal display device for ease of description. In other words, although the display panel DISP comes in various types, such as, e.g., a liquid crystal display panel or an organic light emitting display panel, an example is described below in which the display panel DISP is a liquid crystal display panel for ease of description.

According to an example, the touch panel TSP may be present outside the display panel DISP. In other words, the touch panel TSP and the display panel DISP may be separately manufactured and then combined together. Such touch panel TSP is referred to as an external type or add-on type.

Unlike this, according to an example, the touch panel TSP may be embedded in the display panel DISP. In other words, when the display panel DISP is manufactured, the touch sensor structure of, e.g., the plurality of touch electrodes and the plurality of touch routing lines constituting the touch panel TSP, may be formed along with signal lines and electrodes for display driving. Such touch panel TSP is referred to as an embedded type. Hereinafter, for convenience of description, an example in which the touch panel TSP is an embedded type is described.

Figure 2:
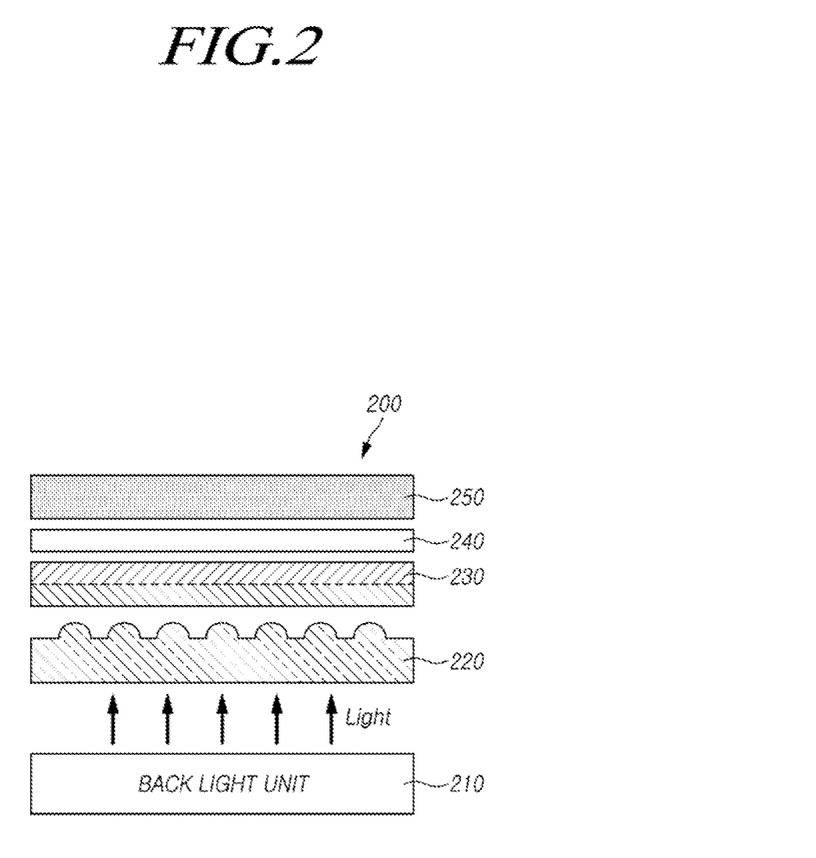
FIG. 2 is a cross-sectional view illustrating a display panel according to an embodiment of the disclosure.
Figure 3:
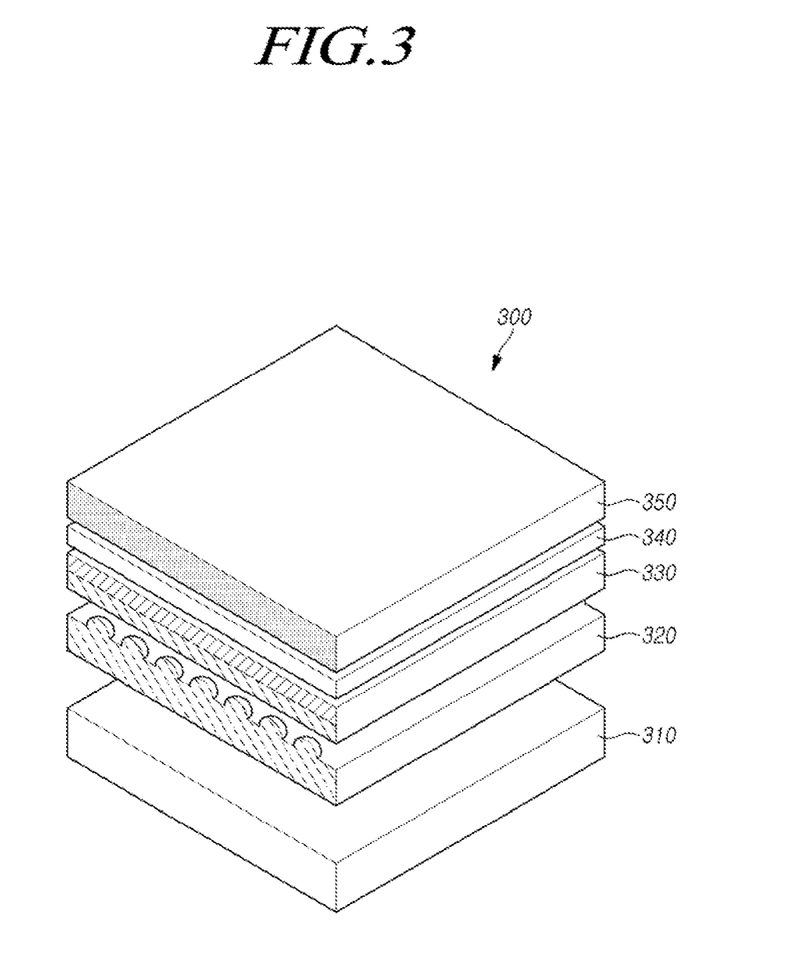
FIG. 3 is a perspective view illustrating a display panel according to an embodiment of the disclosure.

FIG. 2 is a cross-sectional view illustrating a display panel according to an embodiment of the disclosure. FIG. 3 is a perspective view illustrating a display panel according to an embodiment of the disclosure. For example, the display panels 200 and 300 illustrated in FIGS. 2 and 3 may be the display panel DISP of FIG. 1.

Referring to FIGS. 2 and 3, the display panel 200 or 300 may include a structure in which a backlight unit 210 and 310, a micro-lens array 220 and 320, an optical sheet layer 230 and 330, a touch panel 240 and 340, and a surface layer 250 and 350 are sequentially stacked.

For example, the display panel 200 and 300 may include the backlight unit 210 and 310 that outputs light. For example, the display panel 200 and 300 may be disposed on the backlight unit 210 and 310 and may include the micro-lens array 220 and 320 for diffusing the light. For example, the display panel 200 and 300 may be disposed on the micro-lens array 220 and 320, and may include the optical sheet layer 230 and 330 that increases the luminance of the light. For example, the display panel 200 and 300 may be disposed on the optical sheet layer 230 and 330, and may include the touch panel 240 and 340 for receiving a touch input. For example, the display panel 200 and 300 may be disposed on the touch panel 240 and 340 and may include the surface layer 250 and 350 that displays the light.

The display panel 200 and 300 according to the disclosure may display an image with a predetermined brightness and sharpness even in home appliances to which a low-light transmittance material is applied. Specifically, the surface layer 250 and 350 of the display panel 200 and 300 may include a surface material having a light transmittance of 30% or less. For example, the surface material may include at least one of wood, ceramic, glass, textile, and in-mold decoration.

The backlight unit 210 and 310 may be disposed at the lowermost portion of the display panel 200 and 300. The backlight unit 210 and 310 may function to emit light.

For example, the backlight unit 210 and 310 may include a backlight driver (not shown) that controls on and off of the light.

For example, the backlight unit 210 and 310 may use at least one of a red (R) light emitting diode (LED), a green (G) LED, a blue (B) LED, and a white (W) LED.

For example, the light of the backlight unit 210 and 310 may be controlled to be selectively turned on and off by the backlight driver.

The micro-lens array 220 and 320 may be disposed on the backlight unit 210 and 310. The micro-lens array 220 and 320 may diffuse the light. The micro-lens array 220 and 320 may include at least one micro-lens.

For example, the micro-lens array 220 and 320 may include a micro-lens repeatedly formed. The micro-lens has at least one of a circular, oval, and polygonal shape. The light incident on the micro-lens array 220 and 320 may be maximally diffused by at least one micro-lens.

For example, the micro-lens array 220 and 320 may diffuse the light, which cannot be output upward due to total reflection, through at least one micro-lens to output the light upward.

The optical sheet layer 230 and 330 may be disposed on the micro-lens array 220 and 320. The optical sheet layer 230 and 330 may increase the luminance of the light. The optical sheet layer 230 and 330 may minimize a loss of relative luminance by controlling a change in the viewing angle of the light incident from the micro-lens array 220 and 320.

For example, the optical sheet layer 230 and 330 may increase the relative luminance of the light to 80% or more.

In an embodiment, the optical sheet layer 230 and 330 may be formed in a micro-lens on prism (MOP) structure in which at least one micro-lens sheet is disposed on at least one prism sheet. For example, the optical sheet layer 230 and 330 may include a structure in which the micro-lens sheet for diffusing light is stacked on a prism sheet.

For example, the optical sheet layer 230 and 330 may increase the luminance of the light by enhancing the straightness of the light through the MOP structure.

In an embodiment, the optical sheet layer 230 and 330 may be formed in a prism on prism (POP) structure in which a second prism sheet is disposed on a first prism sheet. For example, the optical sheet layer 230 and 330 may include a composite film in which the first prism sheet and the second prism sheet are sequentially stacked.

For example, the optical sheet layer 230 and 330 may increase the luminance of the light by enhancing the straightness of the light through the POP structure.

In an embodiment, the optical sheet layer 230 and 330 may include a reflective polarizing film that increases the luminance of light. For example, the optical sheet layer 230 and 330 may include a double bright enhancement film (DBEF). The DBEF may be a double luminance enhancement film that repeatedly reflects the light and change the polarization direction of the light.

For example, the optical sheet layer 230 and 330 may increase the luminance of the light by enhancing the straightness of the light through the DBEF.

The touch panel 240 and 340 may be disposed on the optical sheet layer 230 and 330. The touch panel 240 and 340 may receive a touch input. The touch panel 240 and 340 may receive a touch input in at least one of a resistive method, a capacitive method, an ultrasonic method, and an infrared method. For example, the touch panel 240 and 340 may include at least one of a resistive sensor, a capacitive sensor, an ultrasonic sensor, and an infrared sensor.

The surface layer 250 and 350 may be disposed on the touch panel 240 and 340. The surface layer 250 and 350 may display light. The surface layer 250 and 350 may include a surface material having a light transmittance of 30% or less.

For example, the surface material may include at least one of wood, ceramic, glass, textile, and in-mold decoration. The surface layer 250 and 350 may be formed on the touch panel 240 and 340 to have a thickness of 25 mm to 35 mm.

Figure 4:
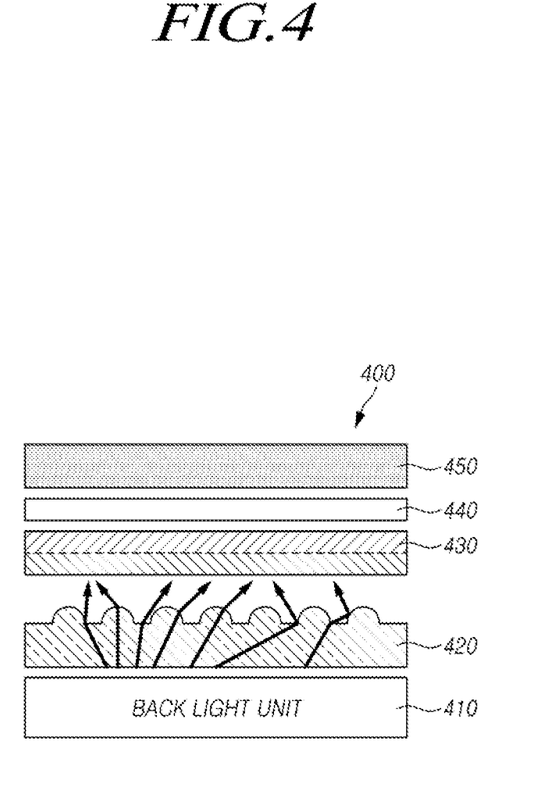
FIG. 4 illustrates propagation of light in a micro-lens array according to an embodiment of the disclosure.

FIG. 4 illustrates propagation of light in a micro-lens array 420 according to an embodiment of the disclosure.

Referring to FIG. 4, the micro-lens array 420 may diffuse the light incident from the backlight unit 410 and output the diffused light to the optical sheet layer 430. The micro-lens array 420 may include at least one micro-lens.

For example, the micro-lens array may include a micro-lens repeatedly formed. The micro-lens has at least one of a circular, oval, and polygonal shape.

As shown in FIG. 4, the light incident on the micro-lens array 420 may be maximally diffused by at least one micro-lens. For example, the micro-lens array 420 may diffuse the light through at least one micro-lens to output the light, which cannot be output upward by total reflection, upward. It is understood that "upward" in this description is relative to the drawing orientation illustrated in, for example, FIG. 4, and is in the direction of the optical sheet layer 430 from the backlight unit 410.

Figure 5:
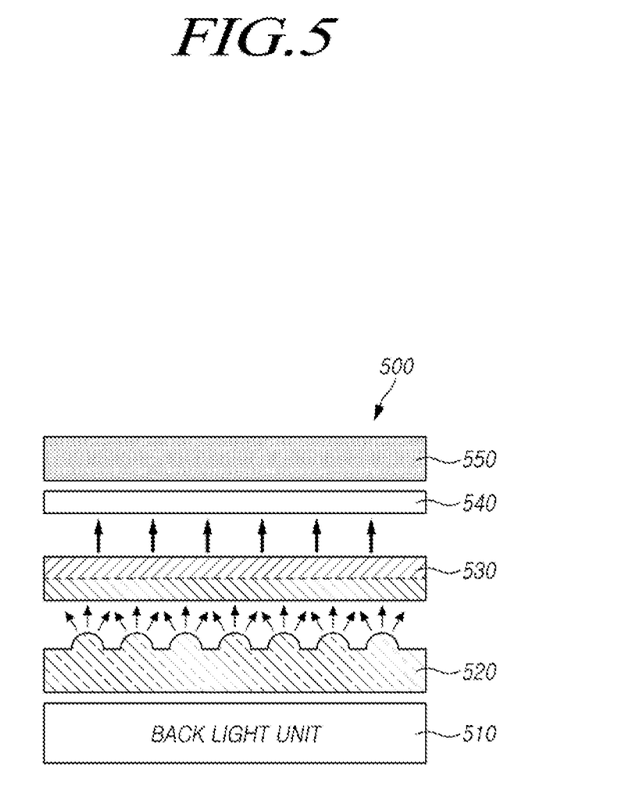
FIG. 5 illustrates changes in light passing through an optical sheet layer according to an embodiment of the disclosure.

FIG. 5 illustrates changes in light passing through an optical sheet layer 530 according to an embodiment of the disclosure.

As shown in FIG. 5, the optical sheet layer 530 may increase the luminance of the light incident from the micro-lens array 520 and output the light to the touch panel 540. The optical sheet layer 530 may minimize a loss of relative luminance by controlling a change in the viewing angle of the incident light.

The optical sheet layer 530 may increase the relative luminance of the light by enhancing the straightness of the incident light. For example, the relative luminance of the light output from the optical sheet layer 530 may be 80% or more.

In an embodiment, the optical sheet layer 530 may be formed in at least one of a micro-lens on prism (MOP) structure in which at least one micro-lens sheet is disposed on at least one prism sheet, a prism on prism (POP) structure in which a second prism sheet is disposed on a first prism sheet, and a structure including a reflective polarizing film. For example, the reflective polarizing film may be a double bright enhancement film (DBEF).

In an embodiment, the optical sheet layer 530 may control the luminance and the viewing angle of the light based on the light transmittance of the surface layer 550. For example, the display panel 500 may receive sensing data about the light transmittance of the surface layer 550. For example, the display controller (e.g., DCTR of FIG. 1) may sense the light transmittance of the surface layer 550 and generate sensing data. Here, the display controller may control the data driving circuit, the gate driving circuit, and the display panel based on the sensing data about the light transmittance of the surface layer 550.

Specifically, the display controller may sense the light transmittance of the surface layer 550 based on artificial intelligence algorithm-based vision examination.

For example, the display controller may include a hardware structure (e.g., a neural network processing device) specialized for processing an artificial intelligence model. The artificial intelligence model may be generated via machine learning. Such learning may be performed, e.g., by the display device of the disclosure where the artificial intelligence model is performed or via a separate external server.

Learning algorithms may include, but are not limited to, e.g., supervised learning, unsupervised learning, semi-supervised learning, or reinforcement learning.

For example, the artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The display controller may include a first sensor for performing a vision examination and a second sensor for performing an electrical examination on the display panel 500 to be examined.

For example, the first sensor may perform a vision examination on the light transmittance of the surface layer 550 by outputting an optical signal to the display panel 500 and receiving feedback of a sensing image from the display panel 500.

For example, the second sensor may perform an electrical examination on the light transmittance of the surface layer 550 by outputting an electrical signal to the display panel 500 and receiving feedback of a sensing waveform from the display panel 500.

The display controller may generate sensing data based on the sensing image and the sensing waveform received from the display panel 500. For example, the display controller may analyze the sensing image and the sensing waveform using an artificial intelligence-based deep learning algorithm.

The display controller may calculate a relative light transmittance of the surface layer 550 by comparing a pre-stored reference light transmittance with data included in the sensing image and the sensing waveform. The display controller may generate sensing data based on the relative light transmittance of the surface layer 550. The sensing data may include the light transmittance of the surface layer 550 as a predetermined numerical value.

The optical sheet layer 530 may receive sensing data about the light transmittance of the surface layer 550 from the display controller. The optical sheet layer 530 may control the luminance and viewing angle of the light based on sensing data received from the display controller.

For example, when the light transmittance of the surface layer 550 included in the sensing data is relatively high, the optical sheet layer 530 may increase the relative luminance and decrease the viewing angle. For example, when the light transmittance of the surface layer 550 included in the sensing data is relatively low, the optical sheet layer 530 may decrease the relative luminance and increase the viewing angle.

As described above, the optical sheet layer 530 included in the display panel 500 of the disclosure may provide customized luminance to the light transmittance of the surface layer 550, thereby optimizing the brightness and sharpness of the image displayed on the surface layer 550.

Figure 6:
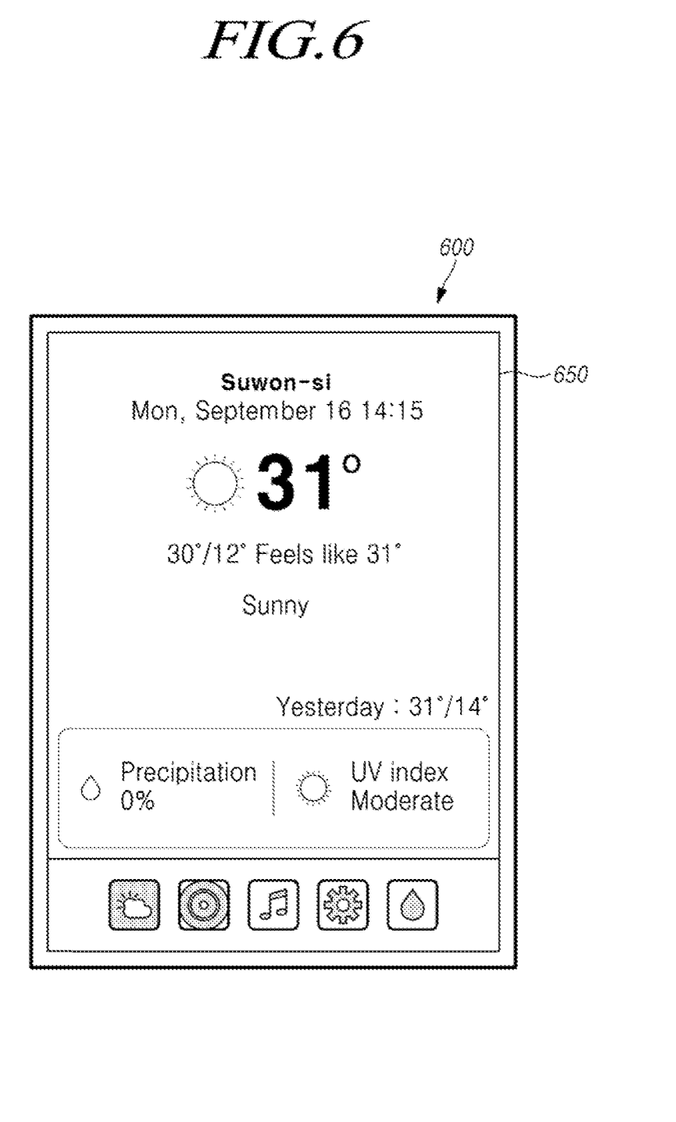
FIG. 6 illustrates an example image displayed on a display panel according to an embodiment of the disclosure.
Figure 7:
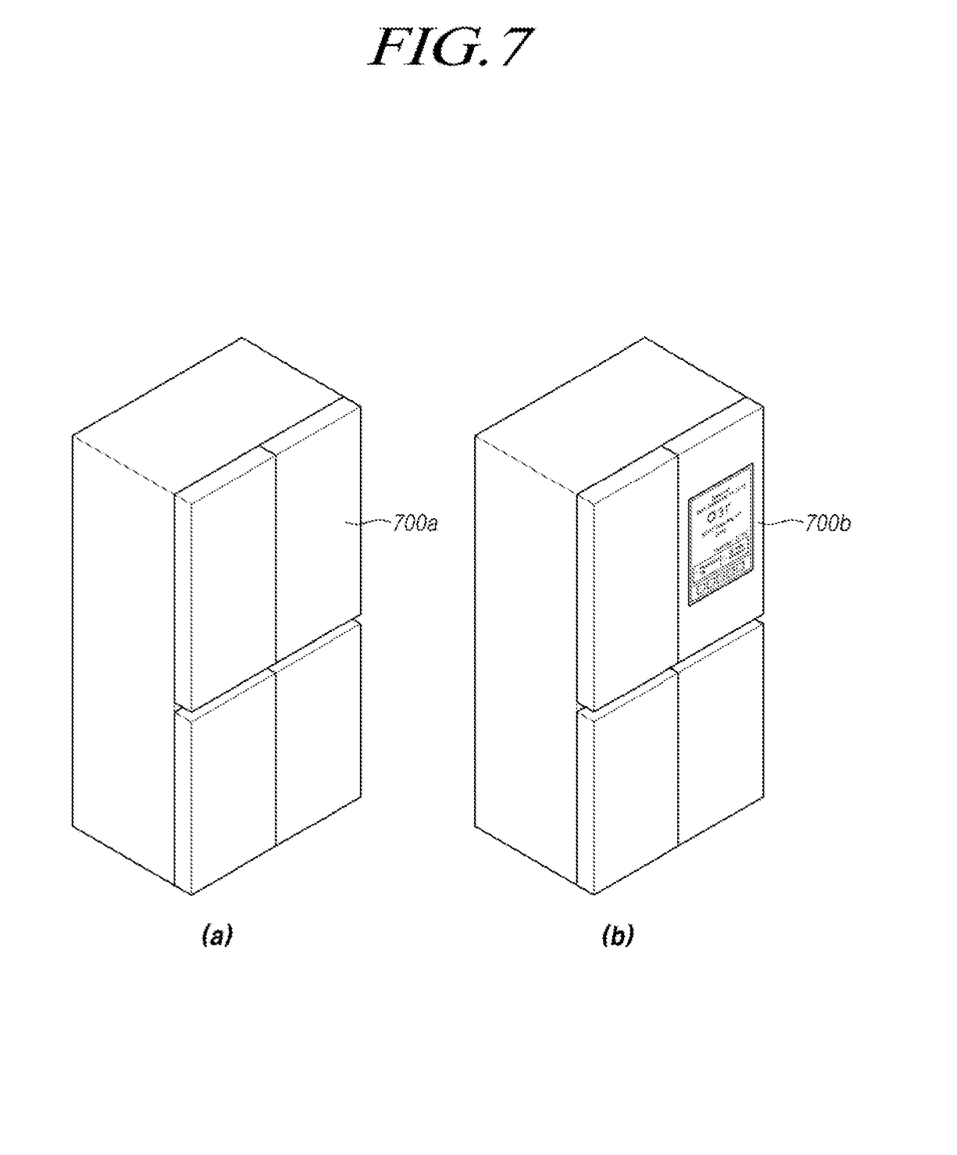
FIG. 7 illustrates an example home appliance to which a display device according to an embodiment of the disclosure is applied.

FIG. 6 illustrates an example image displayed on a display panel 600 according to an embodiment of the disclosure. FIG. 7 illustrates an example home appliance to which a display device of an embodiment of the disclosure is applied.

Referring to FIG. 6, the display panel 600 of the disclosure may display an image on the surface layer 650. For example, the display panel 600 according to the disclosure may enhance the visibility of the image displayed on the surface layer 650 having a light transmittance of 30% or less by controlling the luminance and viewing angle of light.

Referring to FIG. 7, the display panel may be applied to a home appliance. For example, the display panel may be applied to some components 700a and 700b (e.g., a refrigerator door) of a home appliance (e.g., a refrigerator). For example, the surface of a component 700a and 700b of the home appliance may be formed of at least one of wood, ceramic, glass, textile, and in-mold decoration.

As shown in FIG. 7(a), when the display panel 700a is turned off, the display panel 700a may not display an image on the surface layer. For example, when the display panel 700a is turned off, the display panel 700a may function as a design panel having a predetermined texture and unique color.

As shown in FIG. 7(b), when the display panel 700b is turned on, an image may be displayed on the surface layer. For example, when the display panel 700b is turned on, the display panel 700b may function as a display panel that displays predetermined information on some components (e.g., a refrigerator door) of a home appliance (e.g., a refrigerator).

Figure 8:
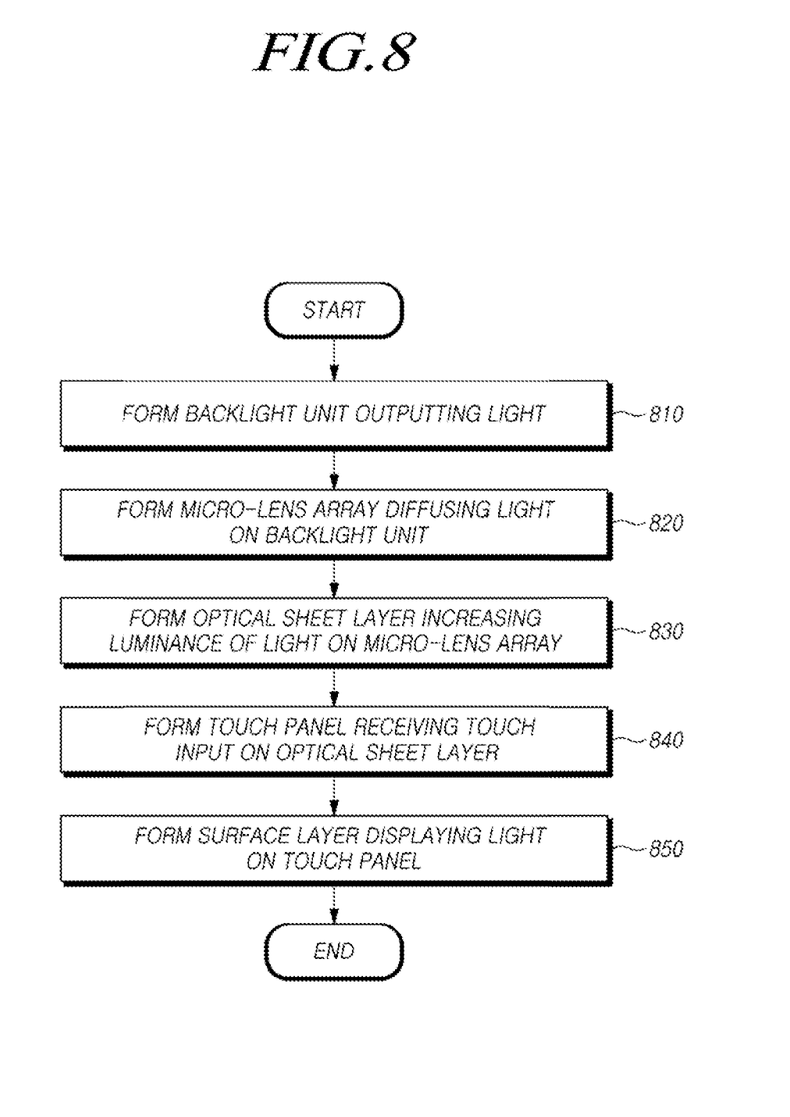
FIG. 8 illustrates a method for manufacturing a display panel according to an embodiment of the disclosure.

FIG. 8 illustrates a method for manufacturing a display panel according to an embodiment of the disclosure.

Referring to FIG. 8, a method for manufacturing a display panel according to embodiments of the disclosure may comprise forming (810) a backlight unit outputting light, forming (820) a micro-lens array diffusing the light on the backlight unit, forming (830) an optical sheet layer increasing a brightness of the light on the micro-lens array, forming (840) a touch panel receiving a touch input on the optical sheet layer, and forming (850) a surface layer displaying the light on the touch panel.

According to an embodiment, in step 810, the method of manufacturing the display panel may form a backlight unit.

For example, the backlight unit may be disposed at the lowermost portion of the display panel. For example, the backlight unit may include a backlight driver for controlling the on and off of the light. For example, the backlight unit may include at least one of a red (R) light emitting diode (LED), a green (G) LED, a blue (B) LED, and a white (W) LED.

According to an embodiment, in step 820, the method of manufacturing the display panel may form a micro-lens array.

For example, the micro-lens array may be disposed on the backlight unit. The micro-lens array may include at least one micro-lens. For example, the micro-lens array may include a micro-lens repeatedly formed. The micro-lens has at least one of a circular, oval, and polygonal shape.

According to an embodiment, in step 830, the method of manufacturing the display panel may form an optical sheet layer.

For example, the optical sheet layer may be disposed on the micro-lens array. For example, the optical sheet layer may be formed in a micro-lens on prism (MOP) structure in which at least one micro-lens sheet is disposed on at least one prism sheet. For example, the optical sheet layer may be formed in a prism on prism (POP) structure in which a second prism sheet is disposed on a first prism sheet. For example, the optical sheet layer may be formed in a structure including a reflective polarizing film. For example, the reflective polarizing film may be a double bright enhancement film (DBEF).

According to an embodiment, in step 840, the method of manufacturing the display panel may form a touch panel.

For example, the touch panel may be disposed on the optical sheet layer. The touch panel may receive a touch input in at least one of a resistive method, a capacitive method, an ultrasonic method, and an infrared method. For example, the touch panel may include at least one of a resistive sensor, a capacitive sensor, an ultrasonic sensor, and an infrared sensor.

According to an embodiment, in step 850, the method of manufacturing the display panel may form a surface layer.

For example, the surface layer may be disposed on the touch panel. The surface layer may include a surface material having a light transmittance of 30% or less. For example, the surface material may include at least one of wood, ceramic, glass, textile, and in-mold decoration. The surface layer may be formed on the touch panel to have a thickness of 25 mm to 35 mm.

As described above, the display device according to the disclosure may display an image with a predetermined brightness and sharpness even in home appliances to which a low-light transmittance material is applied. However, since this has been described above, no duplicate description is given.

The display device according to various embodiments of the disclosure may be one of various types of electronic devices. The display devices may include, for example, a portable communication device (e.g., a smartphone), a computer device, a portable multimedia device, a portable medical device, a camera, a wearable device, or a home appliance. The display devices according to an embodiment of the disclosure are not limited to the above-described devices.

It should be appreciated that various embodiments of the disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device 200 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed:

1. A home appliance comprising: a display panel including:
    a backlight unit to output light;
    a micro-lens array on the backlight unit to diffuse the light output from the backlight unit;
    an adjustable optical sheet layer on the micro-lens array to increase straightness of the light diffused by the micro-lens array;
    a touch panel on the adjustable optical sheet layer, through which the straightened light passes;
    a surface layer on the touch panel to display an image according to the straightened light; and
    a sensor to sense a light transmittance of the surface layer,
    wherein the adjustable optical sheet layer is configured to control a change in a viewing angle of the light diffused by the micro-lens array based on the sensed light transmittance of the surface layer so as to increase the straightness of the light diffused by the micro-lens array.

2. The display panel of claim 1, wherein
    the surface layer includes a surface material having a light transmittance of 30% or less, and
    the surface material includes at least one of wood, ceramic, glass, textile, and in-mold decoration.

3. The display panel of claim 1, wherein
    the micro-lens array includes-a at least one of micro-lens formed in the micro-lens array, the at least one of micro-lens having at least one of a circular, oval, and polygonal shape.

4. The display panel of claim 1, wherein
    the adjustable optical sheet layer has a micro-lens on prism (MOP) structure in which at least one micro-lens sheet is disposed on at least one prism sheet.

5. The display panel of claim 1, wherein
    the adjustable optical sheet layer has a prism on prism (POP) structure in which a second prism sheet is disposed on a first prism sheet.

6. The display panel of claim 1, wherein
    the adjustable optical sheet layer includes a double bright enhancement film (DBEF).

7. The display panel of claim 1, wherein
    the touch panel includes at least one of a resistive sensor, a capacitive sensor, an ultrasonic sensor, and an infrared sensor.

8. The display panel of claim 1, wherein
    the surface layer on the touch panel has a thickness of 25 mm to 35 mm.

9. A method for manufacturing a display panel for a home appliance, the method comprising:
    forming a backlight unit to output light;
    forming a micro-lens array on the backlight unit to diffuse the light output from the backlight unit;
    forming an adjustable optical sheet layer on the micro-lens array to increase straightness of the light diffused by the micro-lens array;
    forming a touch panel on the adjustable optical sheet layer, through which the straightened light passes;

forming a surface layer on the touch panel to display an image according to the straightened light; and forming a sensor to sense a light transmittance of the surface layer, wherein the adjustable optical sheet layer is configured to control a change in a viewing angle of the light diffused by the micro-lens array based on the sensed light transmittance of the surface layer so as to increase the straightness of the light diffused by the micro-lens array.

10. The method of claim 9, wherein forming the micro-lens array includes forming-a at least one of micro-lens, the at least one of micro-lens having at least one of a circular, oval, and polygonal shape.

11. The method of claim 9, wherein forming the adjustable optical sheet layer includes forming a micro-lens on prism (MOP) structure in which at least one micro-lens sheet is disposed on at least one prism sheet.

12. The method of claim 9, wherein forming the adjustable optical sheet layer includes forming a prism on prism (POP) structure in which a second prism sheet is disposed on a first prism sheet.

13. The method of claim 9, wherein forming the adjustable optical sheet layer includes forming a double bright enhancement film (DBEF).

14. A home appliance comprising: a display device including:

a display panel including data lines and gate lines;

a data driving circuit to drive at least one data line of the data lines;

a gate driving circuit to drive the at least one gate line of the gate lines; and a display controller to control the data driving circuit and the gate driving circuit, wherein the display panel includes:

a backlight unit to output light, a micro-lens array on the backlight unit to diffuse the light output from the backlight unit, an adjustable optical sheet layer on the micro-lens array to increase straightness of the light diffused by the micro-lens array, a touch panel on the adjustable optical sheet layer, through which the straightened light passes, surface layer on the touch panel to display an image according to the straightened light, and a sensor to sense a light transmittance of the surface layer, and wherein the adjustable optical sheet layer is configured to control a change in a viewing angle of the light diffused by the micro-lens array based on the sensed light transmittance of the surface layer so as to increase the straightness of the light diffused by the micro-lens array.

15. The display device of claim 14, wherein the surface layer includes a surface material having a light transmittance of 30% or less, and the surface material includes at least one of wood, ceramic, glass, textile, and in-mold decoration.

16. The display device of claim 14, wherein the micro-lens array includes-a at least one of micro-lens formed in the micro-lens array, the at least one of micro-lens having at least one of a circular, oval, and polygonal shape.

17. The display device of claim 14, wherein the adjustable optical sheet layer has a micro-lens on prism (MOP) structure in which at least one micro-lens sheet is disposed on at least one prism sheet.

18. The display device of claim 14, wherein the adjustable optical sheet layer has a prism on prism (POP) structure in which a second prism sheet is disposed on a first prism sheet.

19. The display device of claim 14, wherein the adjustable optical sheet layer includes a double bright enhancement film (DBEF).

20. The display device of claim 14, wherein the display controller senses the light transmittance of the surface layer based on artificial intelligence algorithm-based vision examination.

* * * * *

UNITED STATES PATENT AND TRADEMARK OFFICE
CERTIFICATE OF CORRECTION

PATENT NO. : 12,204,206 B2
APPLICATION NO. : 18/425424
DATED : January 21, 2025
INVENTOR(S) : Minkyung Lee et al.

It is certified that error appears in the above-identified patent and that said Letters Patent is hereby corrected as shown below:

In the Claims

Column 12, Line 36:
In Claim 3, delete "includes-a" and insert -- includes --.

Column 13, Line 12:
In Claim 10, delete "forming-a" and insert -- forming --.

Column 14, Line 6:
In Claim 14, delete "surface" and insert -- a surface --.

Column 14, Line 21:
In Claim 16, delete "includes-a" and insert -- includes --.

Signed and Sealed this
Twenty-seventh Day of May, 2025

Coke Morgan Stewart
*Acting Director of the United States Patent and Trademark Office*